United States Patent
Tripp et al.

(10) Patent No.: US 9,673,752 B2
(45) Date of Patent: Jun. 6, 2017

(54) PHOTOVOLTAIC ARRAY SKIRT AND MOUNTING HARDWARE

(71) Applicant: SolarCity Corporation, San Mateo, CA (US)

(72) Inventors: Kyle Tripp, San Rafael, CA (US); Tyrus Hudson, San Rafael, CA (US)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 14/936,485

(22) Filed: Nov. 9, 2015

(65) Prior Publication Data

US 2017/0133977 A1    May 11, 2017

(51) Int. Cl.
*H02S 30/10*    (2014.01)
*H02S 20/23*    (2014.01)

(52) U.S. Cl.
CPC .............. *H02S 30/10* (2014.12); *H02S 20/23* (2014.12)

(58) Field of Classification Search
CPC .................................. H02S 30/10; H02S 10/23
See application file for complete search history.

(56) References Cited

U.S. PATENT DOCUMENTS

| | | | | |
|---|---|---|---|---|
| 8,191,321 B2* | 6/2012 | McClellan | .......... | E04D 13/0445 126/623 |
| 8,250,829 B2* | 8/2012 | McPheeters | ........ | E04D 13/1476 136/244 |
| 8,640,401 B2* | 2/2014 | Hong | ..................... | F24J 2/5205 248/230.2 |
| 2012/0234378 A1 | 9/2012 | West | | |
| 2014/0158184 A1 | 6/2014 | West | | |

* cited by examiner

*Primary Examiner* — Jeanette E Chapman
(74) *Attorney, Agent, or Firm* — Kilpatrick Townsend & Stockton LLP

(57) ABSTRACT

A photovoltaic array skirt assembly, where the array skirt has a double-groove structure which can accommodate both a splice and a photovoltaic module mounting device. The splice is mounted within the inner channel of the double-groove structure to connect adjacent array skirt sections, and can be locked into the double groove structure to prevent adjacent array skirt sections from uncoupling. One or more photovoltaic module mounting devices are also located in the groove structure, within the outer channel of the double-groove structure, each of which can be further secured in the array skirt with anti-rotation element.

19 Claims, 10 Drawing Sheets

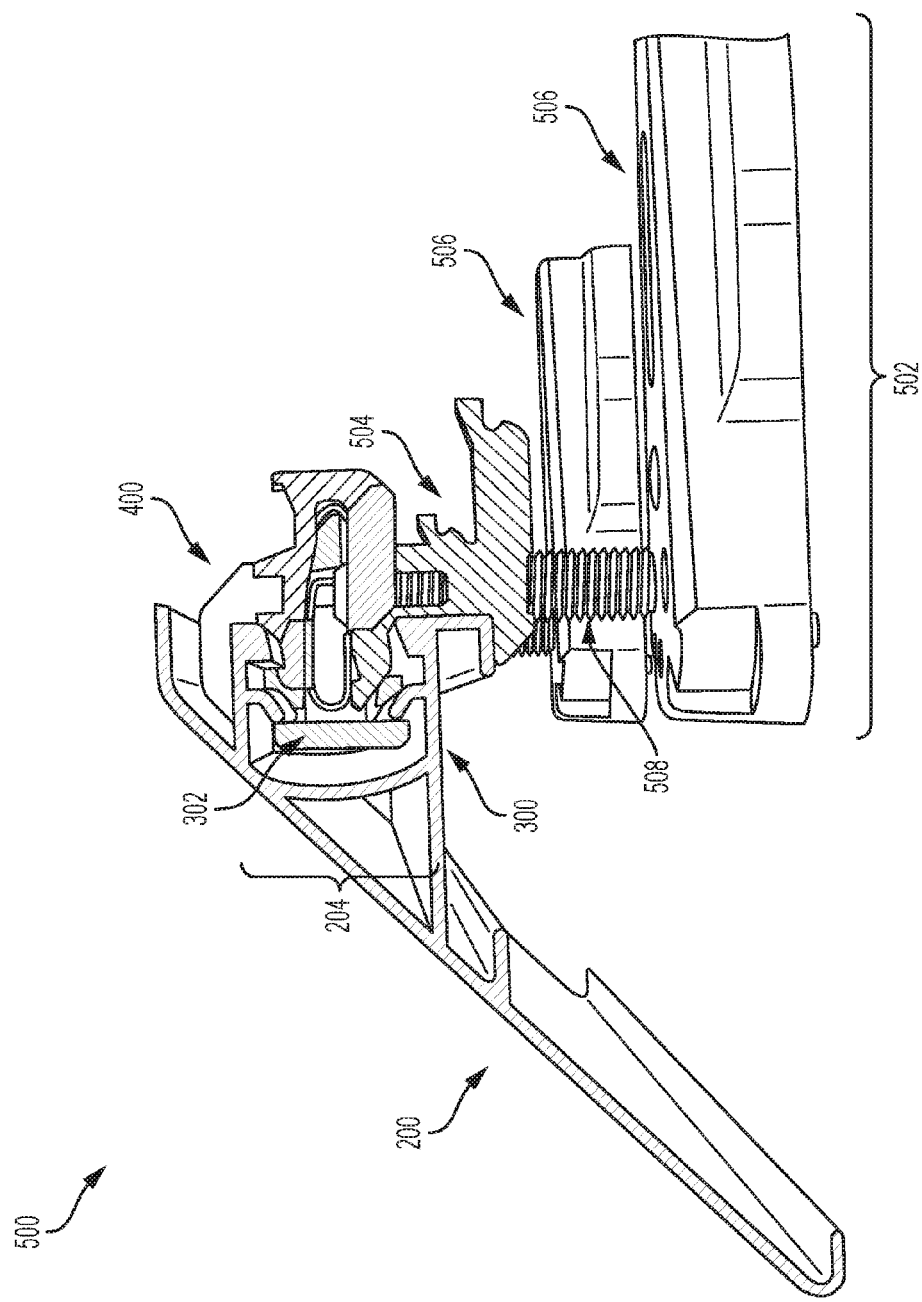

PHOTOVOLTAIC ARRAY SKIRT AND MOUNTING HARDWARE

TECHNICAL FIELD

The present invention relates to mounting systems for photovoltaic modules.

BACKGROUND OF THE INVENTION

There are many systems available for mounting photovoltaic (PV) modules to building structures, such as a roof. These systems serve as a rigid interconnetion element between a roof and a PV module to hold the modules in place and resist the forces of gravity and wind. Traditionally, mounting systems consisted of a framework of rails arranged in rows or columns on a roof. PV modules were then fastened or clamped on onto these rails to secure the modules in place. Eventually, some in the solar industry realized that PV module frames themselves are sufficiently rigid to function in part as the rails of a PV mounting system. By utilizing the inherent rigidity of modules frames as part of the PV mounting system in these so-called rail-free or direct mount systems, system part counts and costs of PV mounting systems were significantly reduced while installation time and overall aesthetics were improved.

Some of the photovoltaic arrays available today, both rail-based and rail-free include array skirts, positioned along a portion of the periphery of the photovoltaic arrays to enhance the overall appearance of a photovoltaic array installations by concealing rails, mounting hardware, wires, and module back sheets from the underside of the array. These array skirts can be formed of one or more array skirt sections, and thus require some form of structural connection or alignment element to maintain a generally aligned orientation and to stay securely attached to the array.

The use of physical interlocks set between two array skirt sections can secure and align the components of an overall array skirt, however, the use of interlocks can result in conflicts with other components of the mounting systems or PV modules themselves. Further, securing interlocks within a groove alongside or concurrently with other mounting structures can be time consuming.

Ideally, it would instead be better to work with a structure that reduces or minimizes mechanical conflict between components of the mounting system including an array skirt, PV modules, and module connectors, allowing for flexibility and adaptability in photovoltaic array installations.

Accordingly, there is a need for an array skirt for a mounting system that enjoys the benefits of mounting system solutions, while reducing costs, improving installation alignment, and increasing installation times relative to such systems.

BRIEF SUMMARY OF THE INVENTION

The present invention provides a system for mounting a photovoltaic array having an array skirt, where the array skirt.

In some embodiments, the present disclosure is directed to an array skirt structure having an exterior surface that is configured to cover at least a portion of an opening beneath an array of photovoltaic modules. The skirt structure includes an outward facing exterior surface, an interior surface proximate to the exterior surface, and a stacked-groove structure extending away laterally from the interior surface. The stacked-groove structure is configured to couple with a mounting structure and includes a bearing region, an outer channel, a medial region, and an inner channel. In some aspects, the bearing region can be configured to rotatably receive a coupling structure, and the medial region can be defined in part as the region between an upper projection and a lower projection of the stacked-groove structure.

In some aspects, the exterior surface of the array skirt can further include an upper flange that is configured to form an upper anti-rotation region. In some aspects, the array skirt can include interior flanges that are configured to form a lower anti-rotation region. In some aspects, the stacked-groove structure can include the upper projection and the lower projection both shaped to point toward a back wall. In some aspects, the outer channel can include an upper outer recess and a lower outer recess that are configured for receiving a portion of the mounting structure. In some aspects, the inner channel can include an upper inner recess and a lower inner recess that are configured for receiving a splice assembly. In some aspects, the bearing region can have an upper-sloped surface and a lower-sloped surface.

In some embodiments, the present disclosure is directed to an array skirt assembly having: a first array skirt and a second array skirt, where each of the first and second array skirts have a stacked-groove structure; a splice assembly that spans across the stacked-groove structures of the first array skirt and the second array skirt, located within the joint stacked-groove structures, being configured to align the first array skirt and the second array skirt; and at least one mounting foot that is engaged with a portion of the stacked-groove structures.

In some aspects, the at least one mounting foot can be further configured to couple with a photovoltaic module. In some aspects, the array skirt assembly further can include an anti-rotation element coupled to both the at least one mounting foot and an anti-rotation region of the stacked-groove structures. In some aspects, the anti-rotation element can be an anti-rotation clip configured to couple within an upper anti-rotation region. In other aspects, the anti-rotation element can be an anti-rotation grip configured to couple within a lower anti-rotation region. In some aspects, the splice assembly can have a splice base that is located within an inner channel of the stacked-groove structures. In some aspects, the mounting foot and the splice base can occupy overlapping positions along the length of the joint stacked-groove structures. In some aspects, the splice assembly can further include a cartridge and at least one rotating connector. In some aspects, the at least one rotating connector is can secure the first array skirt and second array skirt to the splice assembly. In some aspects, the cartridge can maintain a minimum separation distance between the rotating connectors and the splice base. In some aspects, the at least one mounting foot can adjust the height of the array skirt assembly. In some aspects, at least one mounting foot is engaged with each of the first array skirt and the second array skirt.

In some embodiments, the present disclosure is directed to a method of installing an array skirt assembly, including the steps of: aligning a first array skirt and a second array skirt together with a splice assembly, forming a joint array skirt; securing a mounting foot to a roof; and mounting the joint array skirt to the mounting foot, in part rotating the joint array skirt through a bearing region around an engagement member of the mounting foot.

In addition to the exemplary aspects and embodiments described above, further aspects and embodiments will become apparent by reference to the figures and by study of the following detailed descriptions.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 5C is an end profile view of an array skirt assembly, according to aspects of the disclosure.

DETAILED DESCRIPTION OF THE INVENTION

Figure 1:
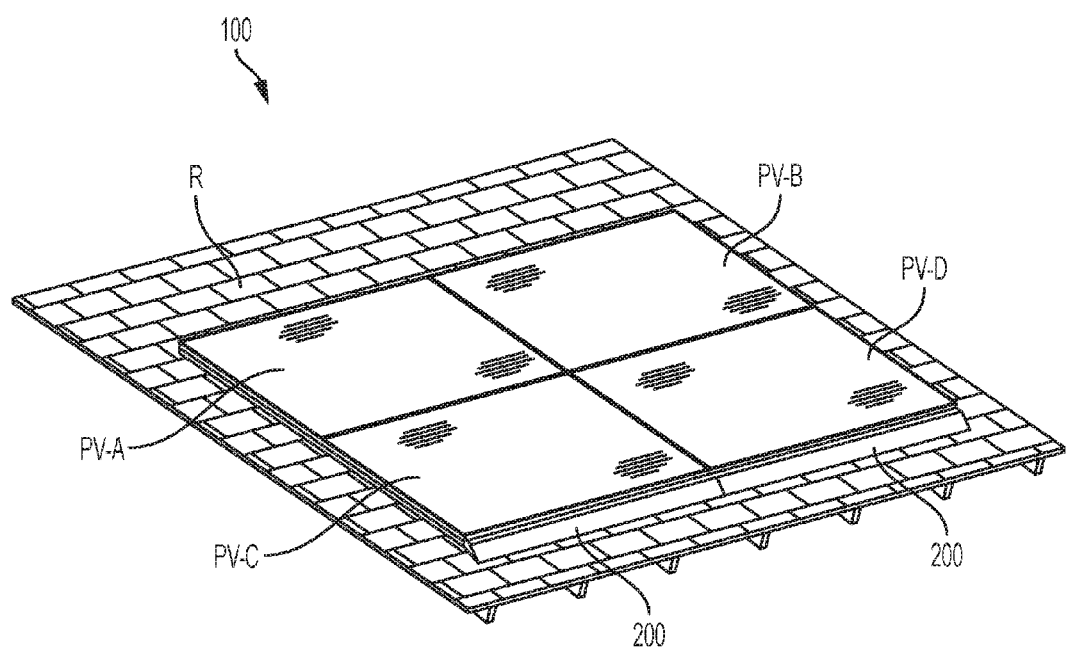
FIG. 1 is a perspective view of an exemplary photovoltaic array installation having an array skirt, according to aspects of the disclosure.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Embodiments of the invention are generally directed towards an array skirt assembly and mounting system for a photovoltaic array system. The array skirt assembly mounting system can include one or more array skirt sections, one or more PV module mounting devices, and an anti-rotation element or member corresponding to each of the one or more PV module mounting devices. The structure of an array skirt section includes a stacked-groove construction, such that components that couple to the array skirt can secure to overlapping regions along the length of the array skirt. The photovoltaic array system includes two or more array skirt sections, with adjacent array skirt sections joined at their ends by a splice assembly. This splice assembly is constructed of a pair of rotating connectors held within a cartridge and riveted to a curved section of metal. The curved section of metal, which can be referred to as the splice base, fits within one of the grooves of the stacked-groove formed in the array skirt section. When the rotating connectors are rotated, they lock into a section of the stacked-groove, simultaneously pulling the splice base, and thereby the section of the array skirt, closer. A PV module mounting device can also fit within a separate section of the stacked-groove, without physically conflicting with any splice assembly located proximate to the PV module mounting device. The anti-rotation element can fit over the PV module mounting device to prevent the PV module mounting device from coming uncoupled from the array skirt structure.

Earlier versions of a groove structure for assembly can be seen, for example, in U.S. Patent Application Publication No. 2012/0234378 to West et al., "PIVOT-FIT CONNECTION APPARATUS AND SYSTEM FOR PHOTOVOLTAIC ARRAYS" and U.S. Patent Application Publication No. 2014/0158184 to West et al., "SKIRT AND OTHER DEVICES FOR PHOTOVOLTAIC ARRAYS", which are herein incorporated by reference in their entirety.

Embodiments of the present disclosure significantly advance the capability of such structures, by expanding the groove structure to be a stacked-groove construction. The stacked-groove structure can alternatively be referred to as a double-groove, a dual-groove, a tiered-groove, or the like. The stacked-groove can be described as having an inner channel and an outer channel. The inner channel of the stacked-groove structure is the deeper of the two channels within the stacked-groove structure, and relatively more proximate to the exterior surface of the array skirt structure. The outer channel of the stacked-groove structure is the shallower of the two channels within the stacked-groove structure, and relatively more distal from the exterior surface of the array skirt structure, but relatively more proximate to a connecting structure to which the array skirt structure is coupled. The stacked-groove structure can also be described as having a medial region located between the inner channel and the outer channel. Further, the stacked-groove structure can also be described as having a bearing region, more distal from the exterior surface of the array skirt structure than the outer channel, and configured to receive a coupling structure that can rotate into position through the bearing region and settle, at least in part, within the outer channel.

Advantageously, the splice assembly can reside within the inner channel of a stacked-groove structure, crossing over or bridging two array skirt sections. When the rotating connectors of the splice assembly are rotated or tightened, the two array skirt sections are aligned and secured in-line with each other. In other words, the splice assembly can function as an interlock between two array skirt sections. Also, the rotating connectors are two-sided and therefore can also serve as a male mounting component for securing a photovoltaic module to the section of array skirt. While some parts of the splice assembly may extend from the inner channel of the stacked-groove structure into the medial region, outer channel, and/or bearing region, the splice assembly can primarily be located within the inner channel such that the splice assembly does not physically take up space in the outer channel where a coupling structure, a PV module, or any other structure may connect to the array skirt structure.

The disclosed system, in addition to providing aesthetic and other enhancements, can allow for use of the array skirt sections as a tool or jig for controlling the location and alignment of modules positioned in the first installed row of a photovoltaic array. Similarly, the disclosed system can allow for use of the array skirt sections as a tool or jig for controlling the location and alignment of modules positioned along a side edge (e.g. left, right, diagonal) of a photovoltaic array. Moreover, the disclosed system can be relied upon as being aligned due to the use of the splice assemblies. Further, the disclosed system can additionally allow for more flexibility in installation, due to the reduction of conflict regions that would otherwise occur between the splice assembly and PV module coupling structure if the splice assembly did not primarily reside in the inner channel of the skirt array structure.

The installation of a PV module to a mounting system can be a time and labor intensive process, particularly where components of the overall photovoltaic array require precise and fine alignment. The disclosed system also allows for efficient and straightforward alignment of array skirt sections, such that photovoltaic array skirts can be easily connected and secured to an edge of a photovoltaic array.

FIG. 1 is a perspective view of exemplary photovoltaic array 100 having array skirt 200. In particular, photovoltaic array 100 is shown having four PV modules, PV-A, PV-B, PV-C, and PV-D where PV-C and PV-D are positioned toward the bottom (or south) of the roof R. Each of PV-C and PV-D have array skirt structure 200 coupled to their respective bottom edges, at least in part preventing precipitation, wind, and debris from entering the space between the roof R and photovoltaic array 100. While each of PV-C and PV-D have an individual array skirt structure 200 coupled to their bottom edges, it is understood that a single array skirt structure 200 could extend across the length of both PV-C and PV-D, or that more than two array skirt structure 200 could extend across the length of both PV-C and PV-D. It can be further understood that photovoltaic array 100 having more than two PV modules forming the bottom edge of photovoltaic array 100 can have sufficient array skirt structure 200 to extend along a partial or full length of photovoltaic array 100. Similarly, in can be understood that array skirt structure 200 can be coupled to an edge of photovoltaic array 100 tracking the slope of roof R, e.g. array skirt structure 200 could be coupled to the side of photovoltaic array 100 defined by PV-A and PV-C.

Figure 2A:
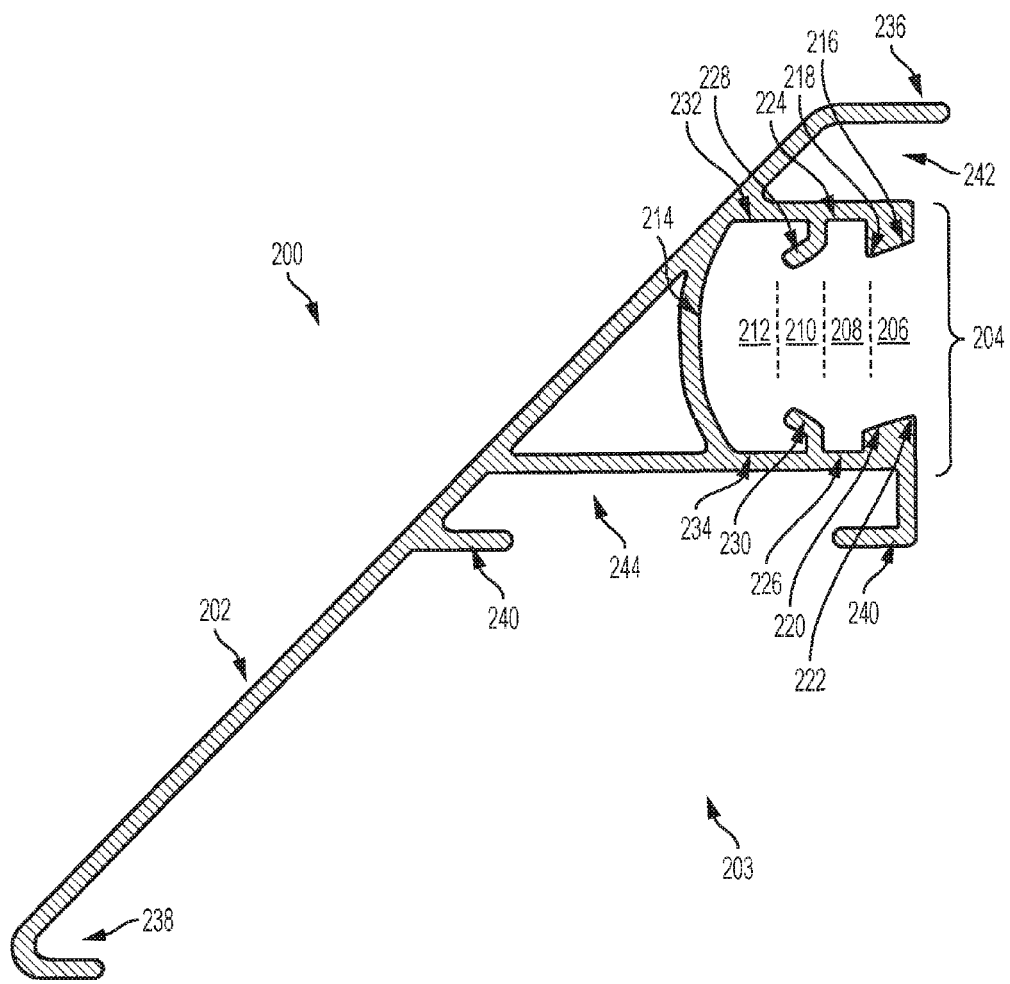
FIG. 2A is an end cross-sectional view of an array skirt structure, according to aspects of the disclosure.

FIG. 2A is an end cross-sectional view of array skirt structure 200, with array skirt structure 200 vertically oriented. Array skirt structure 200 can be formed by an extrusion process or by a metal stamping/pressing and die cutting process. Array skirt structure 200 can be made of metals or alloys as known in the industry, including but not limited to aluminum, steel, tin, titanium, and the like. Array skirt structure 200 of the present disclosure has exterior surface 202 and stacked-groove structure 204, which in combination, allow for array skirt structure 200 to couple with a connector and/or a PV module to as to form an edge of a photovoltaic array. The side of array skirt structure 200 opposite to exterior surface 202 can be referred to as the interior side of array skirt structure 200, or generally as interior surface 203. Interior surface 203 can have several structures extending away laterally from the exterior surface, such as groove structures or flanges. In particular, interior surface 203 includes, in part, stacked-groove structure 204, where stacked-groove structure 204 is a female shaped structure configured in part to receive a male engagement structure for coupling and connection.

Array skirt structure 200, when installed as part of a photovoltaic array, is oriented such that exterior surface 202 faces outward from PV modules of the photovoltaic array so as to provide a surface that can deflect an amount of precipitation, wind, and debris from entering a region underneath the photovoltaic array and provide an aesthetically consistent finish to the array. In other words, exterior surface 202 is configured to cover at least a portion of an opening beneath an array of photovoltaic modules. Exterior surface 202 can be solid, vented, contoured, patterned, non-patterned, or otherwise constructed to allow for a degree of airflow or precipitation control along exterior surface 202. Exterior surface 202 can be shaped such that, when installed on a roof, exterior surface 202 forms an angle relative to the incline of the roof of less than 5°, 5°, 10°, 15°, 20°, 25°, 30°, 35°, 40°, 45°, 50°, 55°, greater than 55°, or at any increment or gradient of angle therein.

Stacked-groove structure 204 can be generally divided into four vertical regions (viewed from the perspective of FIG. 2A): bearing region 206, outer channel 208, medial region 210, and inner channel 212, with back wall 214 defining the innermost surface of stacked-groove structure 204. Bearing region 206 may be defined in part by a pair of sloped surfaces, upper-sloped surface 216 and lower-sloped surface 220. Upper-sloped surface 216 and lower-sloped surface 220 can be generally parallel to each other and sloped at an angle of about 15° with respect to an axis perpendicular to the orientation of the four vertical regions. Upper-sloped surface 216 and lower-sloped surface 220 do not necessarily need not be parallel to each other, and can, in some embodiments, form other oblique angles with respect to an axis perpendicular to the orientation of the four vertical regions that are less than or greater than 15°. The angles of upper-sloped surface 216 and lower-sloped surface 220 with respect to the axis perpendicular to the orientation of the four vertical regions defines an angle, referred to herein as the insertion angle, which is explained in greater detail below. Further examples of the insertion angle include but are not limited to 2° or greater, 5° or greater, 10° or greater and 20° or greater.

Upper-sloped surface 216 can include upper bearing portion 218, which represents the bottommost portion of upper-sloped surface 216 from the perspective of FIG. 2A. Upper bearing portion 218 can be a line along outer channel 208 where upper sloped surface 216 and adjacent outer channel wall come together along the length of stacked-groove structure 204. In various embodiments, upper bearing portion 218 can have a sharp profile, a rounded profile, or a flattened profile. Similarly, lower-sloped surface 220 can include lower bearing portion 222, which represents the uppermost portion of lower-sloped surface 220 from the perspective of FIG. 2A. Lower bearing portion 222 be a line along outer channel 208 where lower-sloped surface 220 and adjacent outer channel wall come together along the length of stacked-groove structure 204. In various embodiments, lower bearing portion 222 can have a sharp profile, a rounded profile, or a flattened profile. Upper bearing portion 218 and lower bearing portion 222 may be offset from each other horizontally within stacked-groove structure 204; in other words, either upper bearing portion 218 or lower bearing portion 222 can be located relatively more or less distally from back wall 214.

Particular geometries defined by upper-sloped surface 216 and lower-sloped surface 220, as noted above, can be parallel to each other in some embodiments of stacked-groove structure 204. In such an embodiment, a perpendicular distance between the sloped surfaces 216 and 220 can be equal to, greater than, or less than a vertical distance between parallel planes passing through bearing portions 218 and 222. The relationship between the perpendicular distance and the vertical distance, as well as the insertion angle, can function to control and aid with the insertion of an engagement member or other coupling structure into bearing region 206.

Outer channel 208 is located between bearing region 206 and medial region 210 within stacked-groove structure 204. Outer channel 208 includes and can be in-part defined by the contours of upper outer recess 224 in an upper portion of stacked-groove structure 204 and lower outer recess 226 in a lower portion of stacked-groove structure 204. Upper outer recess 224 and lower outer recess 226 together define a receiving slot or shape in outer channel 208 configured for receiving various couplings from other components of a PV mounting system. The length from upper outer recess 224 to lower outer recess 226 may be longer than the perpendicular distance between sloped surfaces 216 and 220. In some aspects, outer channel 208 can be considered a key slot into which a matching key structure can fit.

Medial region 210 is located between outer channel 208 and inner channel 212 within stacked-groove structure 204. Medial region 210 is further defined as the region between upper projection 228 and lower projection 230. Both upper projection 228 and lower projection 230 are shaped to point inward within stacked-groove structure 204 toward back wall 214. In particular, the geometries of upper projection 228 and lower projection 230 can point toward a shared focal point. In other embodiments, either one or both of upper projection 228 and lower projection 230 can have a geometry perpendicular to recess walls of stacked-groove structure 204, not pointing toward back wall 214. Medial region 210 is further configured to accommodate portions of other structures that may primarily reside within either outer channel 208 or inner channel 212. The distance between upper projection 228 and lower projection 230 can be equal to, greater than, or less than either the perpendicular distance between sloped surfaces 216 and 220, or the vertical distance between bearing portions 218 and 222.

Inner channel 212 is located deeper within stacked-groove structure 204 than medial region 210 and can be further defined by the contours of back wall 214, upper inner recess 232, and lower inner recess 234. Inner channel 212 can be configured to accommodate various couplings or other components of a PV mounting system. In particular, inner channel 212 can accommodate a splice assembly as described in further detail herein. Components of a PV mounting system that primarily reside within inner channel 212 can also extend in part into any or all of medial region 210, outer channel 208, and bearing region 206. In some embodiments, inner channel 212 can have a cross-sectional area greater than the cross-sectional area of outer channel 208. In other embodiments, inner channel 212 can have a cross-sectional area equal to the cross-sectional area of outer channel 208. In further embodiments, inner channel 212 can have a cross-sectional area less than the cross-sectional area of outer channel 208. In some aspects, inner channel 212 can be considered a key slot into which a matching key structure can fit.

In some aspects, exterior surface 202 can be shaped to include upper flange 236 and lower flange 238, both of which can be configured to further deflect precipitation, wind, and debris from entering an area behind array skirt structure 200, on or underneath the photovoltaic array. In some aspects, the side of array skirt structure 200 opposite to exterior surface 202 can include internal flanges 240 which can be used as gripping or anchoring surfaces for coupling array skirt structure 200 to an additional mounting structure, such as a mounting foot or other structural component of a photovoltaic array. Alternatively, this feature may be used for wire management. In still further alternatives, flanges 240 may define a downward facing groove that could be used to attach other components. In further aspects, upper anti-rotation region 242 can be formed between upper flange 236 and the structural walls forming the upper region of stacked-groove 204. Upper anti-rotation region 242 can be configured or shaped to receive an anti-rotation clip, as described in further detail herein. In yet further aspects, lower anti-rotation region 244 can be formed between internal flanges 240 and the structural walls forming the lower region of stacked-groove 204. Lower anti-rotation region 244 can be configured or shaped to receive an anti-rotation grip, as described in further detail herein.

Figure 2B:
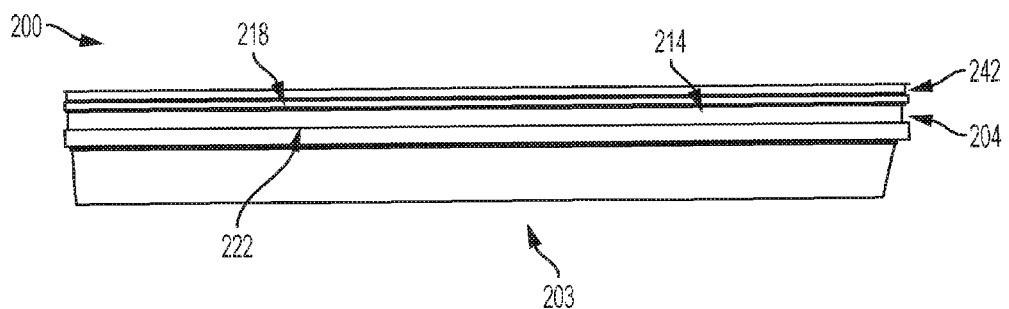
FIG. 2B is a side profile view of an array skirt structure, according to aspects of the disclosure.

FIG. 2B is a side profile view of array skirt structure 200, particularly showing interior surface 203. As shown, upper bearing portion 218 and lower bearing portion 222 in part define interior surface 203. Back wall 214 of stacked-groove structure 204 is shown in between upper bearing portion 218 and lower bearing portion 222. Anti-rotation receiver region 242 is also shown, located relatively above stacked-groove structure 204 in the construction of array skirt structure 200.

Array skirt structures 200 can be produced in a variety of lengths, heights, widths, and thicknesses, as appropriate or needed for photovoltaic array installations. In some embodiments, a given array skirt structure 200 can have a length typical of a sixty (60) or seventy-two (72) cell photovoltaic module. Further, array skirt structures 200 can be produced such that the cross-sectional thickness of array skirt structures 200 sections (e.g. exterior surface 202, back wall 214, upper projection 228, lower projection 230, etc.) typical of photovoltaic modules as known in the industry. Moreover, array skirt structures 200 can be produced to have a height such that, when installed as part of a photovoltaic array, array skirt structure 200 covers a side of any given PV module of the photovoltaic array and a region between the photovoltaic array and the roof on which the photovoltaic array is installed.

Figure 3A:
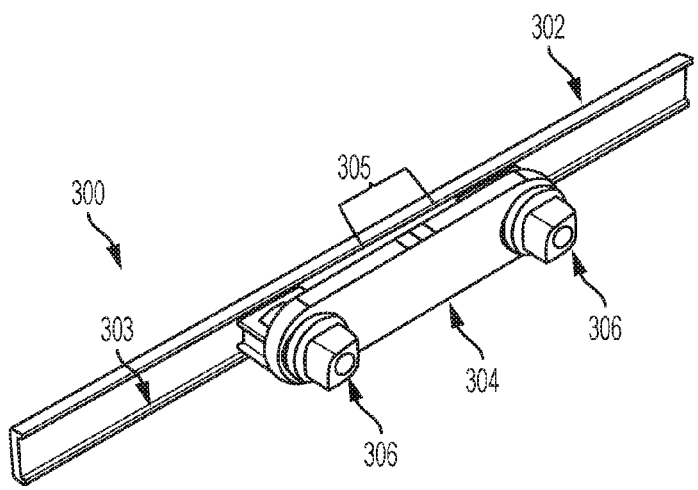
FIG. 3A is a front perspective view of a skirt splice assembly, according to aspects of the disclosure.

FIG. 3A is a front perspective view of skirt splice assembly 300. Splice base 302 is a beam-like member with curved edges that can be made of metals or alloys as known in the industry, including but not limited to aluminum, steel, titanium, and the like. The regions of splice base 302 that extend so as to form the concave shape of splice base 302 can be referred to as interior splice base ridges 303. Splice base 302 can be formed through an extrusion process, a stamping process, or a casting process as known in the industry. Cartridge 304 is positioned on the concave side of splice base 302, providing for support and spacing of rotating connectors 306 along splice base 302. Cartridge 304 can be made of plastic as known in the field, or of generally lightweight metals or alloys as known in the field. Cartridge 304 can be formed by an extrusion process, an injection molding process, a cutting process, or the like. Cartridge 304 can further include tightening indicators 305, sometimes called timing marks, formed as a number of ridges or indentations along a surface of cartridge of 304, which can indicate to an operator a degree of tightening that should be applied to rotating connectors 306. Splice base 302 can have a length sufficient such that, when secured within inner channel 212 of any given pair of array skirt structures 200, both array skirt structures 200 will be held in alignment along the length of splice base 302. In various embodiments, splice base 302 can have a length of about 5% the length of array skirt structure 200, about 10% the length of array skirt structure 200, about 15% the length of array skirt structure 200, or any increment or gradient of length therein relative to array skirt structure 200. In such embodiments, splice base 302 in use can thereby span across two array skirt structures 200 symmetrically (with an equal length of splice base 302 within inner channel 212 of each array skirt structure 200) or asymmetrically.

Figure 3B:
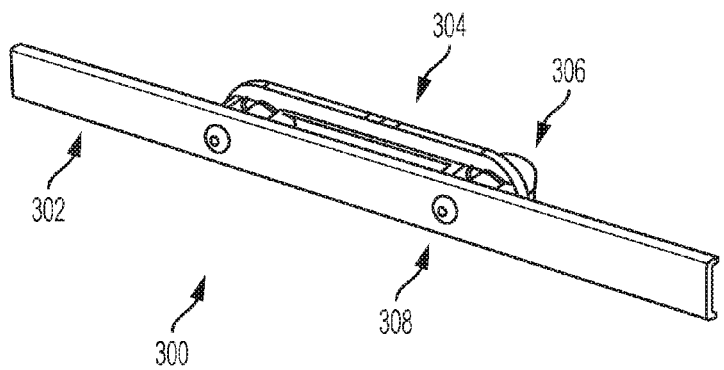
FIG. 3B is a back perspective view of a skirt splice assembly, according to aspects of the disclosure.

FIG. 3B is a back perspective view of skirt splice assembly 300. As shown, rivets 308 extend into and through splice base 302, from the convex side to the concave side, securing rotating connectors 306 to splice base 302. Rivets 308 can be formed of the same material as rotating connectors 306, or of a different material than rotating connectors 306. Rivets 308 hold rotating connectors 306 in place with splice base 302 while still allowing them to rotate in place. Rotating connectors 306 can be traditional bolts as known in the industry can be so-called "Zep connectors" such as those manufactured by Zep Solar of San Rafael, Calif. Alternatively, rotating connectors 306 may be another type of rotating connector known in the art.

Figure 3C:
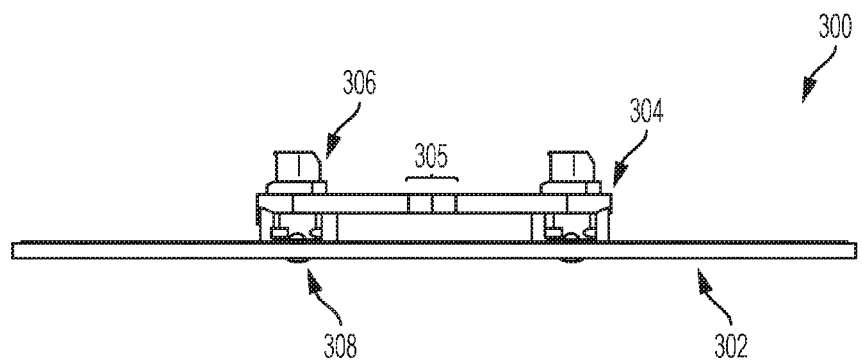
FIG. 3C is a side profile view of a skirt splice assembly, according to aspects of the disclosure.
Figure 3D:
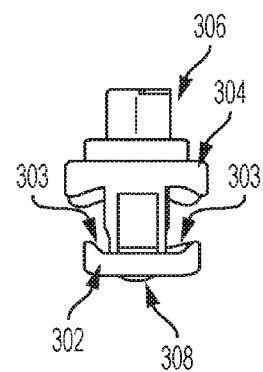
FIG. 3D is an end profile view of a skirt splice assembly, according to aspects of the disclosure.
Figure 3E:
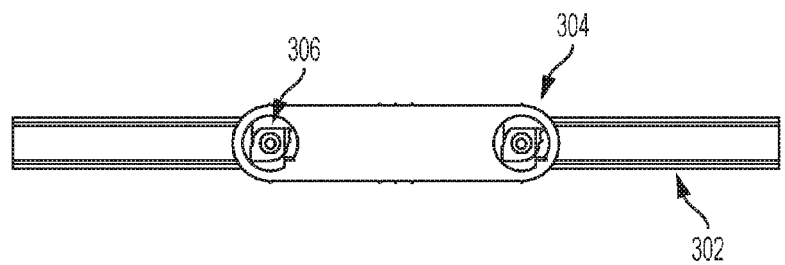
FIG. 3E is a front plan view of a skirt splice assembly, according to aspects of the disclosure.

FIG. 3C is a side profile view of skirt splice assembly 300, FIG. 3D is an end profile view of skirt splice assembly 300, and FIG. 3E is a front plan view of skirt splice assembly 300. As shown, cartridge 304 can establish and maintain a spacing of rotating connectors 306 along the length of splice base 302. Further, cartridge 304 can have a height that establishes a minimum separation distance, such that when rotating connectors 306 are tightened, any tightening components of rotating connectors 306 are not tightened past the minimum separation distance (alternatively referred to as a tightening distance) between rotating connectors 306 and splice base 302. In some embodiments, cartridge 304 can have a height less than, equal to, or greater than a depth of stacked-groove structure 204. In various aspects, tightening indicators 305 can be present on carriage 304 as one, two, three, four, five, or more than five ridges proximate to each other formed on the surface of cartridge 304.

In many embodiments, the curvature of splice base 302, or the angles of interior splice base ridges 303, can be configured to match with the angles at which upper projection 228 and lower projection 230 of stacked-groove structure 204 are set. Accordingly, the angles of interior splice base ridges 303 can be constructed such that when rotating connectors 306 are tightened with splice assembly 300 primarily set within inner channel 212, interior splice base ridges 303 and relative opposing surfaces of upper projection 228 and lower projection 230 press against each other in a generally flush configuration. When splice assembly 300 extends across two array skirt structures 200, the frictional interface between interior splice base ridges 303 and relative opposing surfaces of upper projection 228 and lower projection 230 pressed against each other locks the two corresponding array skirt structures 200 in line with each other. Rivets 308 can further provide a frictional interface surface between splice assembly and back wall 214 of stacked-groove 204.

Figure 3F:
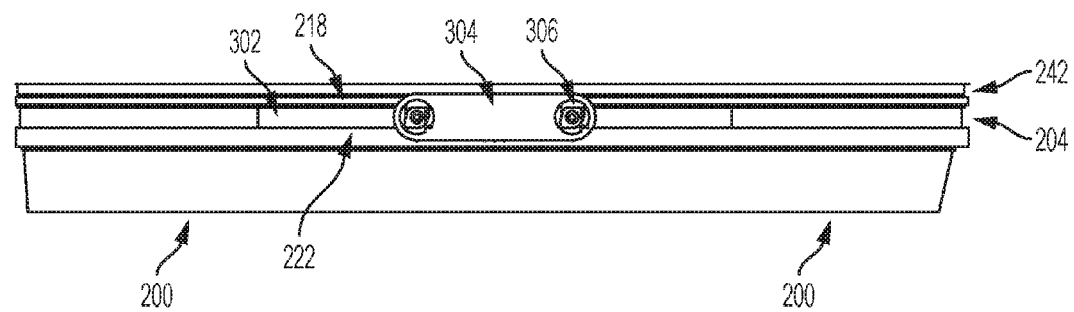
FIG. 3F is a front plan view an array skirt structure and skirt splice assembly, according to aspects of the disclosure.

FIG. 3F is a side profile view array skirt structure 200 and splice assembly 300, particularly where splice assembly 300 is positioned primarily within inner channel 212 of two sections of array skirt structure 200 aligned end-to-end. As shown, in application where splice assembly 300 is positioned across two sections of array skirt structure 200 (primarily within inner channel 212 that extends along both array skirt structures 200), as rotating connectors 306 are tightened, the frictional interface between interior splice base ridges 303 and upper projection 228 and lower projection 230 of both array skirt structures 200 can align and secure the corresponding array skirt structures 200 together. The connection and alignment secured by splice assembly 300 spanning across two array skirt structures 200 can render the space between array skirt structures 200 to appear nearly seamless, such that two sections of array skirt structure 200 appear to be and function as a single array skirt structure 200. From the perspective of FIG. 3F, it can be seen that splice base 302 sits within stacked-channel 204, but is in part occluded by at least the contours of upper bearing portion 218 and lower bearing portion 222. Similarly, cartridge 304 extends out from splice base 302 through stacked-groove 204 and, as cartridge 304 holds rotating connectors 306 in place along splice base 302, and in part occludes a length of upper bearing portion 218, lower bearing portion 222, and upper anti-rotation region 242 along the length of array skirt structures 200.

Figure 4A:
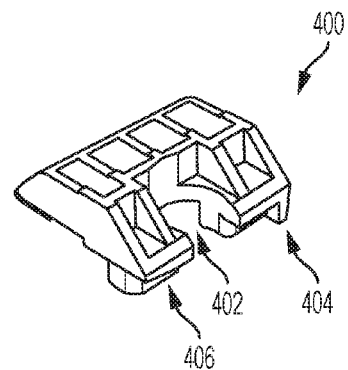
FIG. 4A is a top-front perspective view of first embodiment of an anti-rotation clip, according to aspects of the disclosure.
Figure 4E:
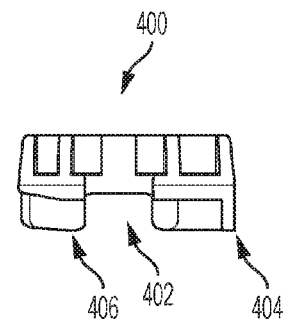
FIG. 4E is a front profile view of an anti-rotation clip as shown in FIG. 4A, according to aspects of the disclosure.
Figure 4B:
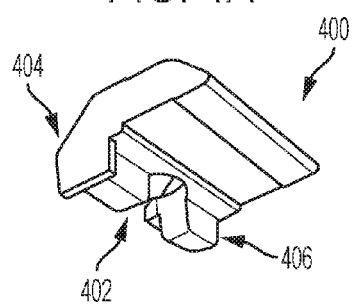
FIG. 4B is a back-bottom perspective view of an anti-rotation clip as shown in FIG. 4A, according to aspects of the disclosure.
Figure 4F:
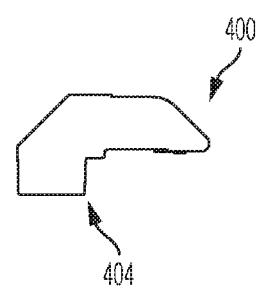
FIG. 4F is a left-side profile view of an anti-rotation clip as shown in FIG. 4A, according to aspects of the disclosure.
Figure 4C:
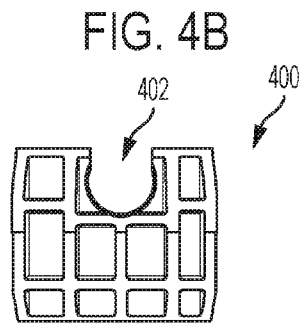
FIG. 4C is a top plan view of an anti-rotation clip as shown in FIG. 4A, according to aspects of the disclosure.
Figure 4G:
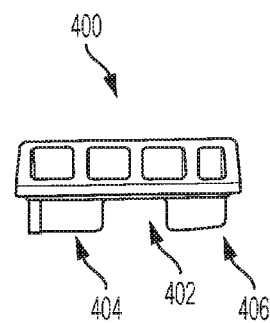
FIG. 4G is a back profile view of an anti-rotation clip as shown in FIG. 4A, according to aspects of the disclosure.
Figure 4D:
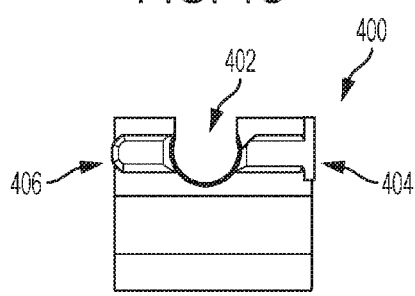
FIG. 4D is a bottom plan view of an anti-rotation clip as shown in FIG. 4A, according to aspects of the disclosure.
Figure 4H:
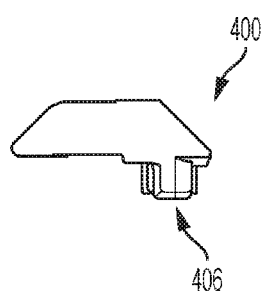
FIG. 4H is a right-side profile view of an anti-rotation clip as shown in FIG. 4A, according to aspects of the disclosure.

FIGS. 4A-4H are several views of a first embodiment of anti-rotation clip 400. Specifically: FIG. 4A is a top-front perspective view of anti-rotation clip 400; FIG. 4B is a back-bottom perspective view of anti-rotation clip 400; FIG. 4C is a top plan view of anti-rotation clip 400; FIG. 4D is a bottom plan view of anti-rotation clip 400; FIG. 4E is a front profile view of anti-rotation clip 400; FIG. 4F is a left-side profile view of anti-rotation clip 400; FIG. 4G is a back profile view of anti-rotation clip 400; and FIG. 4H is a right-side profile view of anti-rotation clip 400. Anti-rotation clip 400 can be used in a wedging or jamming position in combination with array skirt structure 200 and a coupling structure of a photovoltaic array mounting system so as to prevent undesired rotation or movement of the coupling structure within array skirt structure 200. In particular, anti-rotation clip 400 can be configured to fit within upper anti-rotation region 242 of array skirt structure 200.

Anti-rotation clip 400 can be formed by an extrusion process, an injection molding process, a cutting process, or the like. Anti-rotation clip 400 can be made of plastics as known in the field, or of generally lightweight metals or alloys as known in the field. Further, anti-rotation clip 400 can be shaped to have particular structural features, configured to couple with other components of a photovoltaic array mounting system. In some embodiments, anti-rotation clip 400 can have screw gap 402, such that when anti-rotation clip 400 is positioned in a wedging or jamming position proximate to a coupling structure, a screw adjustment point remains accessible due to the void of screw gap 402 aligned appropriately with adjustment point of the coupling structure. In some embodiments, anti-rotation clip 400 can also have first molding region 404 and second molding region 406, where both of first molding region 404 and second molding region 406 can be shaped to match and fit with another components of a photovoltaic array mounting system. In various aspects, first molding region 404 and second molding region 406 can have: the same shape, mirrored shapes, complementary shapes, or different shapes. In other various aspects, first molding region 404 and second molding region 406 may be generally equal in size or have generally different sizes, as appropriate to fit with a PV module coupling structure. In some aspects, anti-rotation clip 400 can be formed to have a solid-piece construction. In other aspects, anti-rotation clip 400 can be formed (as shown) to have a skeletal construction such that anti-rotation clip 400 has a relatively reduced weight and such that the material from which anti-rotation clip 400 is made can expand and contract in response to temperature without adversely displacing other components of a photovoltaic array system.

Figure 5A:
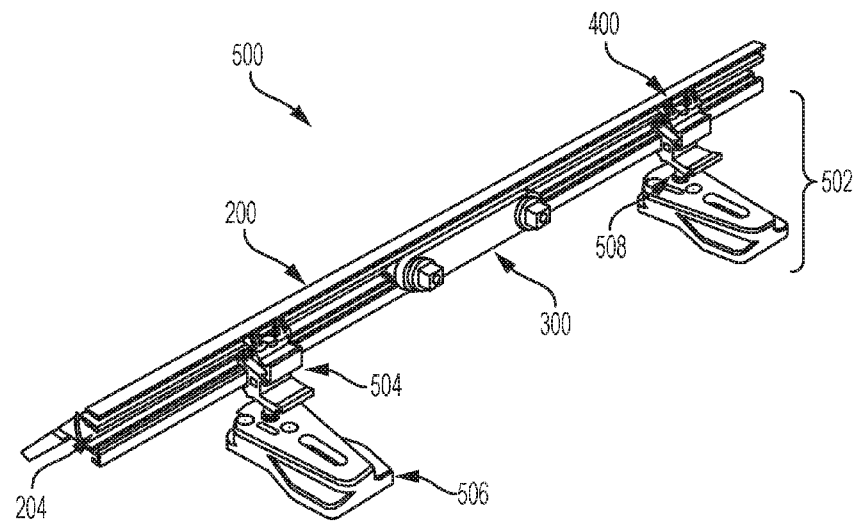
FIG. 5A is a perspective view of an array skirt assembly, according to aspects of the disclosure.

FIG. 5A is a perspective view of array skirt assembly 500. Array skirt assembly 500 is a multiple piece construction, and the exemplary section of array skirt assembly 500 shown in FIG. 5A includes two sections of array skirt structure 200, splice assembly 300, and two mounting feet 502, where each mounting foot 502 is further secured to array skirt structure 200 with a corresponding anti-rotation element, specifically anti-rotation clip 400. Each mounting foot 502 includes engagement member 504 and mounting base 506, with height adjustment screw 508 connecting engagement member 504 and mounting base 506 to each other. In a photovoltaic array installation, multiple array skirt assemblies 500 can form a border for the photovoltaic array along a bottom row of the photovoltaic array and/or along sides of the photovoltaic array. As shown, splice assembly 300 extends across two sections of array skirt structure 200, splice assembly 300 being positioned within stacked-groove structure 204, primarily within inner channel 212, securing and aligning the two sections of array skirt structure 200 to each other such that the connection between two sections of array skirt structure 200 is nearly seamless and the two array skirt sections 200 appear and function as a single array skirt structure 200 (which can be referred to as a joint array skirt). Each of the mounting feet 502 are also located and secured within stacked-groove structure 204, where engagement member 504 is shaped to fit as a male structure within bearing region 206 and outer channel 208 of stacked-groove structure 204. In some aspects, engagement member 504 can also be shaped to fit in part within medial region 210 of stacked-groove structure 204.

In many aspects, engagement member 504 is further shaped and configured to connect and secure to a PV module, on the side of engagement member 504 opposite from where engagement member 504 attaches to array skirt structure 200. In many aspects, mounting base 506 is configured to anchor to a roof, and can position engagement member 504 at a desired distance and/or a desired angle above the roof, for orienting and aligning PV modules further connected to mounting foot 502. Adjustment of any individual mounting foot 502 allows for deploying a photovoltaic array installation that can account for different slopes, uneven surface, or irregular shapes of various roofs.

In some aspects, adjustment of any given mounting foot 502 can be accomplished by changing the distance between engagement member 504 and mounting base 506 along height adjustment screw 508. Also, as seen in FIG. 5A, splice base 302 and engagement member 504 of mounting foot 502 can co-exist at the same location without interference.

Figure 5B:
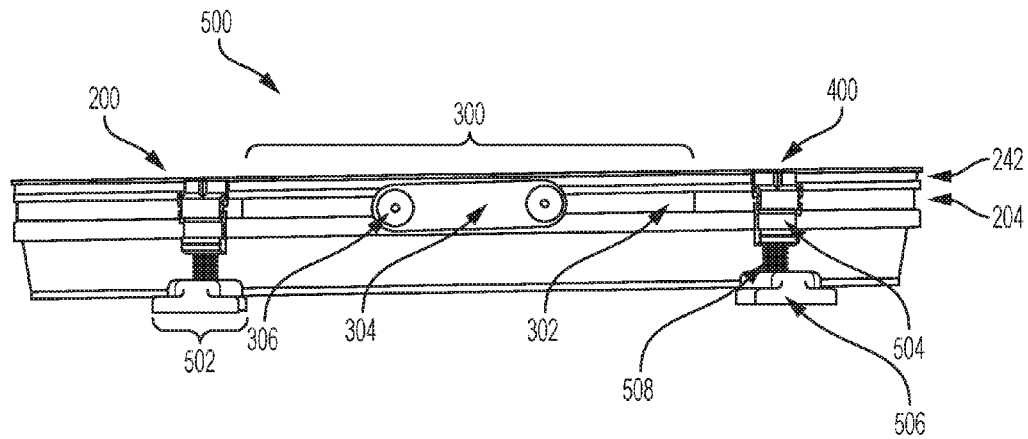
FIG. 5B is a front plan view of an array skirt assembly, according to aspects of the disclosure.

FIG. 5B is a side profile view of array skirt assembly 500, further showing the arrangement of splice assembly 300 and mounting feet 502 relative to each other along and within array skirt structure 200. As shown, splice assembly 300 is positioned within stacked-groove structure 204 between two mounting feet 502. Each mounting foot 502 has engagement member 504 also set within stacked-groove structure 204. While in some photovoltaic array installations it may be aesthetically pleasing that two array skirt structures 200 joined by splice assembly 300 appear seamless (as shown), it is not necessary for the function of the overall mounting system that two array skirt structures 200 joined by splice assembly 300 do in face appear seamless. Further, while as shown each mounting foot 502 does not occupy a position overlapping with splice assembly 300 along the length of array skirt structures 200, the construction and configuration of array skirt structures 200 stacked-groove structure 204 allows for any given mounting foot 502 to occupy a location along the length of array skirt structures 200 that overlaps with splice base 302 of splice assembly 300, as seen in FIG. 5A.

FIG. 5C is an end profile view of array skirt assembly 500 and particularly shows the arrangement of splice assembly 300 and mounting feet 502 relative to each other within stacked-groove structure 204 of array skirt structure 200. More precisely, FIG. 5C shows an end profile view of array skirt assembly 500 with the arrangement of splice base 302 and engagement members 504 relative to each other within stacked-groove structure 204. Splice base 302 is positioned within inner channel 212 while engagement members 504 are positioned within medial region 210, outer channel 208, and/or bearing region 206. Accordingly, there is no physical conflict between splice base 302 and engagement members 504, and thus splice base 302 and engagement members 504 can occupy overlapping positions along the length of array skirt structure 200. This provides much greater flexibility over the prior art, in particular in installations where it is imperative that leveling foot 502 be installed over a roof rafter, as if often the case. In this example, anti-rotation clip 400 is positioned so as to fit both within a contour of engagement member 504 and within upper anti-rotation region 242 of array skirt structure 200, providing for a wedge or jam that prevents undesired rotation or either array skirt structure 200 or mounting foot 502 relative to each other once array skirt assembly 500 is assembled.

Splice assembly 300 can align two adjacent array skirt structures 200 in part due to splice base 302 spanning across inner channels 212 of stacked-groove structures 204, acting as a guide-piece such that the cross-sectional surfaces of stacked-groove structures 204 which butt against each other are flush, and such that exterior surfaces 202 of array skirt structures 200 form a generally uniform plane. In other words, the rigid splice base 302 being in inner channels 212 of both array skirt structures 200 forces both array skirt structures 200 to be aligned with each other. In some aspects, carriage 304, spanning across medial region 210, outer channel 208, and/or bearing region 206, can also in part act as a guide-piece such that array skirt structures 200 are in alignment. In some aspects, engagement member 504 can be shaped to fit within both of upper outer recess 224 and lower outer recess 226 of outer channel 208, which can be considered as a key and key slot arrangement. Similarly, in some aspects, splice base 302 (and interior splice base ridges 303) can be shaped to fit within upper inner recess 232 and lower inner recess 234 of inner channel 212, which can also be considered as a key and key slot arrangement.

As noted with regard to FIGS. 3C-3F above, FIG. 5C further shows that in a configuration where rotating connectors 306 are tightened, interior splice base ridges 303 of splice base 302 and upper projection 228 and lower projection 230 are pressed together. The frictional interface between interior splice base ridges 303 and upper projection 228 and lower projection 230 can secure adjacent, aligned array skirt structures 200 next to each other. Tightening of rotating connectors 306 can also further refine and improve alignment of adjacent array skirt structures 200. Carriage 304 can maintain a tightening distance such that rotating connectors 306 are not over-tightened, which may put excess strain on splice base 302, upper projection 228, or lower projection 230. Carriage 304 can also maintain a spacing between a pair of rotating connectors 306 in splice assembly 300 such that one of rotating connectors 306 is positioned within stacked-groove structure 204 of both adjacent array skirt structures 200.

Carriage 304, being located in part within medial region 210, outer channel 208, and/or bearing region 206, constitutes a conflict zone with any given engagement member 504 also located within stacked-groove structure 204. Nevertheless, the conflict zone created by carriage 304 within stacked-groove structure 204 is relatively smaller and/or narrower than mounting interlock structures known in the field used to connect roofing skirt structures. The relatively smaller and/or narrower carriage 304 allows for mounting foot 502 to be positioned in more locations along the length of array skirt structure 200 as compared to a traditional interlock or similar structure. In particular, mounting foot 502 on one side of carriage 304, or mounting feet 502 on both sides of carriage 304, can be positioned in an overlapping position with splice base 302 within the length of stacked-groove structure 204.

Figure 6A:
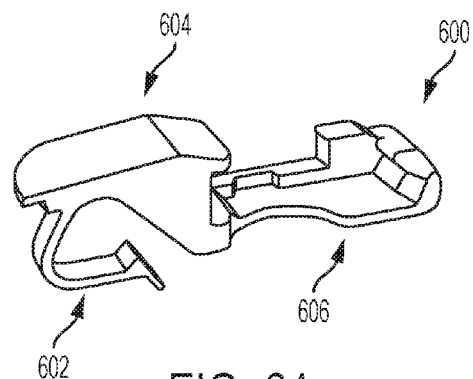
FIG. 6A is a top-side perspective view of a second embodiment of an anti-rotation grip, according to aspects of the disclosure.
Figure 6E:
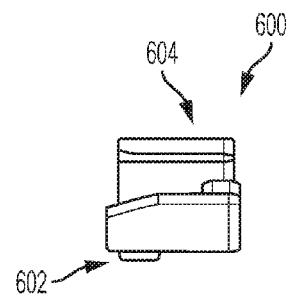
FIG. 6E is a front profile view of an anti-rotation grip as shown in FIG. 6A, according to aspects of the disclosure.
Figure 6B:
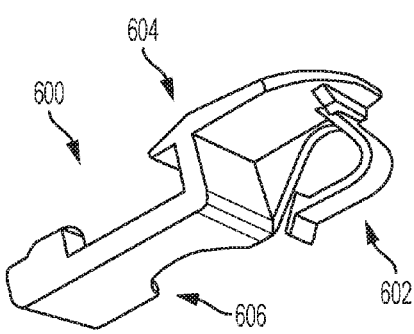
FIG. 6B is a bottom-side perspective view of an anti-rotation grip as shown in FIG. 6A, according to aspects of the disclosure.
Figure 6F:
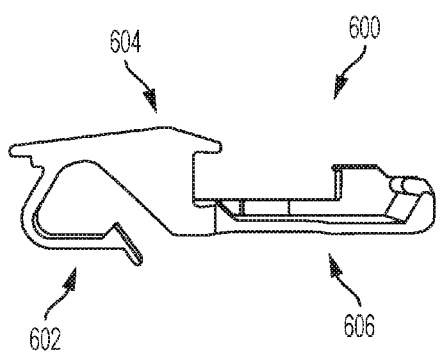
FIG. 6F is a right-side profile view of an anti-rotation grip as shown in FIG. 6A, according to aspects of the disclosure.
Figure 6C:
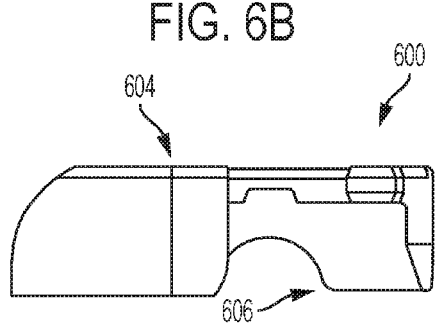
FIG. 6C is a top plan view of an anti-rotation grip as shown in FIG. 6A, according to aspects of the disclosure.
Figure 6G:
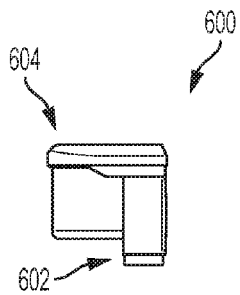
FIG. 6G is a back profile view of an anti-rotation grip as shown in FIG. 6A according to aspects of the disclosure.
Figure 6D:
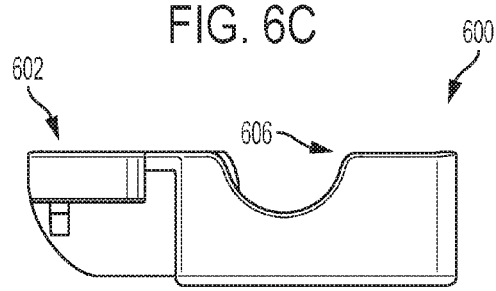
FIG. 6D is a bottom plan view of an anti-rotation grip as shown in FIG. 6A, according to aspects of the disclosure.
Figure 6H:
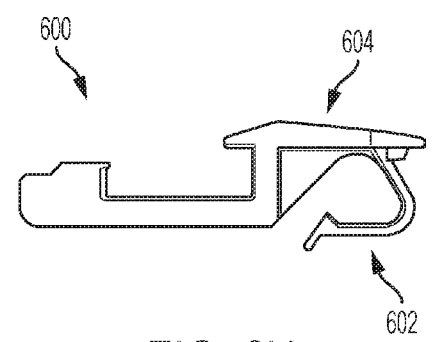
FIG. 6H is a left-side profile view of an anti-rotation grip as shown in FIG. 6A, according to aspects of the disclosure.

FIGS. 6A-6H are several views of a second embodiment of anti-rotation grip 600. Specifically: FIG. 6A is a top-side perspective view of anti-rotation grip 600; FIG. 6B is a bottom-side perspective view of anti-rotation grip 600; FIG. 6C is a top plan view of anti-rotation grip 600; FIG. 6D is a bottom plan view of anti-rotation grip 600; FIG. 6E is a front profile view of anti-rotation grip 600; FIG. 6F is a right-side profile view of anti-rotation grip 600; FIG. 6G is a back profile view of anti-rotation grip 600; and FIG. 6H is a left-side profile view of anti-rotation grip 600. Anti-rotation grip 600 can be used in a wedging or jamming position in combination with array skirt structure 200 and a coupling structure of a photovoltaic array mounting system so as to prevent undesired rotation or movement of the coupling structure within array skirt structure 200. In particular, anti-rotation grip 600 can be configured to fit within lower anti-rotation region 244 of array skirt structure 200.

Anti-rotation grip 600 can be formed by an extrusion process, an injection molding process, a cutting process, or the like. Anti-rotation grip 600 can be made of plastics as known in the field, or of generally lightweight metals or alloys as known in the field. Further, anti-rotation grip 600 can be shaped to have particular structural features, configured to couple with other components of a photovoltaic array mounting system. In some aspects, anti-rotation grip 600 can be formed to have a solid-piece construction. In other aspects, anti-rotation grip 600 can be formed of a material such that anti-rotation grip 600 is made can expand and contract in response to temperature without adversely displacing other components of a photovoltaic array system. As shown, anti-rotation grip 600 can include ventral handle 602, dorsal surface 604, and ventral structure 606.

A portion of anti-rotation grip 600, dorsal surface 604, fits within lower anti-rotation region 244, which is located in the bottom facing portion of array skirt structure 200. Anti-rotation grip 600 can be inserted into lower anti-rotation region 244 such that the longitudinal axis of anti-rotation grip 600 is parallel to the length of lower anti-rotation region 244 along array skirt structure 200. Anti-rotation grip 600 can subsequently be rotated or twisted such that the longitudinal axis of anti-rotation grip 600 is perpendicular to the length of lower anti-rotation region 244. Once rotated to be perpendicular to the length of lower anti-rotation region 244, dorsal surface 604 is oriented to interface with and/or rest on internal flange 240, preventing anti-rotation grip 600 from falling out of lower anti-rotation region 244. In some aspects, once anti-rotation grip 600 is rotated to be in a perpendicular orientation, ventral handle 602 is located proximate to the interior side of array skirt structure 200 and ventral structure is proximate to mounting foot 502. Ventral handle 602 can contact the interior side of array skirt structure 200 to form a frictional interface, in part securing anti-rotation grip 600 in place. Ventral structure 606 can contact mounting foot 502, and ventral structure 606 can be particularly shaped to match the contour of engagement member 504 and/or height adjustment screw 508. A frictional interface between ventral structure 606 can further secure anti-rotation grip 600 in place, preventing array skirt structure 200 from rotating to disconnect from the mounting foot 502.

Figure 6I:
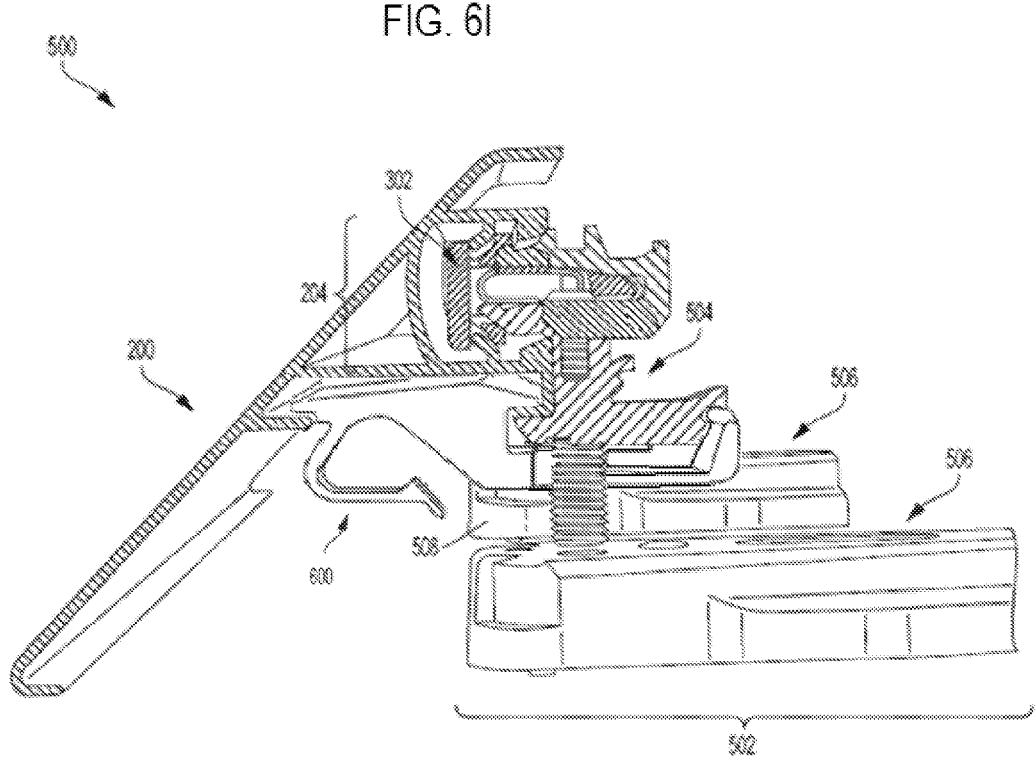
FIG. 6I is an end profile view of an array skirt assembly, according to aspects of the disclosure.

FIG. 6I is an end profile view of an alternative embodiment of array skirt assembly 500, that particularly shows the arrangement of splice assembly 300 and mounting feet 502 relative to each other within stacked-groove structure 204 of array skirt structure 200. Similar to the embodiment shown in FIG. 5C, FIG. 6I shows an end profile view of array skirt assembly 500 with the arrangement of splice base 302 and engagement members 504 relative to each other within stacked-groove structure 204. Splice base 302 is positioned within inner channel 212 while engagement members 504 are positioned within medial region 210, outer channel 208, and/or bearing region 206. Accordingly, there is no physical conflict between splice base 302 and engagement members 504, and thus splice base 302 and engagement members 504 can occupy overlapping positions along the length of array skirt structure 200. This provides much greater flexibility over the prior art, in particular in installations where it is imperative that leveling foot 502 be installed over a roof rafter, as if often the case. In this example, anti-rotation grip 600 is positioned so as to fit both within a contour of engagement member 504 and within lower anti-rotation region 244 of array skirt structure 200, providing for a wedge or jam that prevents undesired rotation or either array skirt structure 200 or mounting foot 502 relative to each other once array skirt assembly 500 is assembled.

Figure 7A:
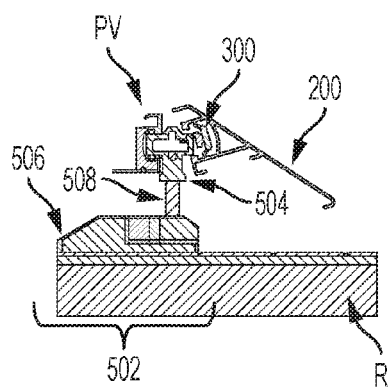
FIGS. 7A-7D are a progression of illustrations showing an exemplary method of connecting an array skirt assembly, according to aspects of the disclosure.
Figure 7B:
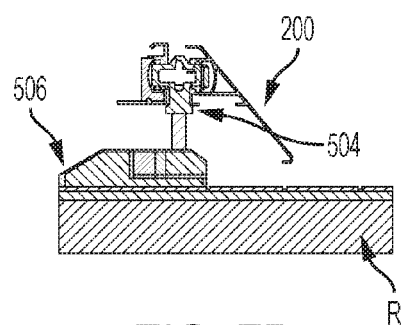

FIGS. 7A-7D are a progression of illustrations showing an exemplary method of connecting an array skirt assembly to a mounting foot and/or photovoltaic array. FIG. 7A shows mounting foot 502 positioned on a roof R via mounting base 506. Engagement member 504 is supported by height adjustment screw 508 at a position above mounting base 506. An exemplary photovoltaic module PV is coupled to one side of engagement member 504, with array skirt structure 200 is positioned on the opposite side of engagement member 504. As shown in FIG. 7A, array skirt structure 200 includes splice assembly 300 within stacked-groove assembly 204 of array skirt structure 200, and array skirt structure 200 is not yet coupled to mounting foot 502. Engagement member 504 of mounting foot 502 is partially within bearing region 206 of stacked-groove structure 204, allowing array skirt structure 200 to rotate into a connected position with engagement member 504. In other words, the shape of bearing region 206 allows for array skirt structure 200 to rotate around and couple with engagement member 504. Conversely, the shape of bearing region 206 can also allow for engagement member 504 to rotate into and couple with array skirt structure 200. As shown in FIG. 7B, array skirt structure 200 is coupled to mounting foot 502, specifically with engagement member 504 within outer channel 208 of stacked-groove structure 204, and with splice assembly 300 partially visible within inner channel 212 of stacked-groove structure 204.

Figure 7C:
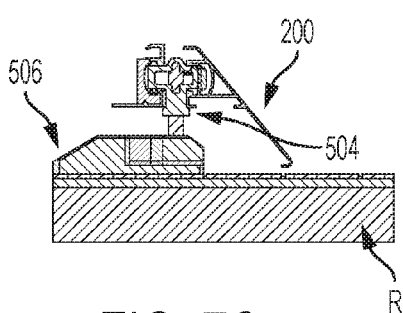
Figure 7D:
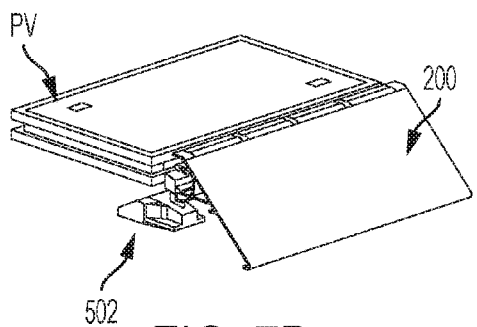

As shown in FIG. 7C, array skirt structure 200, engagement member 504, and photovoltaic module PV are all positioned closer to roof R than in FIG. 7B, reflecting a change in height achieved by moving the coupled structures along height adjustment screw 508. FIG. 7D shows a perspective view of the coupled array skirt structure 200, mounting foot 502, and photovoltaic module PV as the structures would be connected for a photovoltaic array.

In some aspects, installation of array skirt structure 200 on a roof is performed before installation of photovoltaic modules, such that engagement members 504 are in place for photovoltaic modules to pivot-fit and couple with, thereby forming a first row of photovoltaic modules for a photovoltaic array.

It can be further understood that the stacked-groove structure considered in the present disclosure is applicable for photovoltaic array components in addition to array skirts. For example, photovoltaic module frames can be constructed to have a stacked-groove structure such that adjacent photovoltaic modules can be more efficiently aligned while also giving more flexibility to how and where such photovoltaic modules are mounted to mounting systems. Similarly, splice bases as considered in the present disclosure can be used for components in photovoltaic array installations where a traditional interlock may create a conflict zone or be problematic for mounting the photovoltaic array.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An array skirt, comprising:
   an exterior surface, configured to cover at least a portion of an opening beneath a photovoltaic module;
   an interior surface proximate to the exterior surface; and
   a stacked-groove structure extending laterally away from the interior surface, configured to couple with a mounting structure, the stacked-groove structure further comprising a bearing region configured to receive a coupling structure, an outer channel, a medial region between an upper projection and a lower projection, and an inner channel, wherein the inner channel is dimensioned to accommodate a splice base of a splice assembly, and wherein the splice base and a mounting foot of the mounting structure occupy overlapping positions along the stacked-groove structure.

2. The array skirt of claim 1, wherein the exterior surface further comprises an upper flange configured to form an upper anti-rotation region.

3. The array skirt of claim 1, further comprising interior flanges configured to form a lower anti-rotation region.

4. The array skirt of claim 1, wherein the upper projection and the lower projection are both shaped to point toward the inner channel.

5. The array skirt of claim 1, wherein the outer channel includes an upper outer recess and a lower outer recess configured for receiving a portion of the mounting structure.

6. The array skirt of claim 1, wherein the inner channel includes an upper inner recess and a lower inner recess configured for receiving a splice assembly.

7. The array skirt structure of claim 1, wherein the bearing region comprises an upper sloped surface and a lower sloped surface.

8. An array skirt assembly, comprising:
   a first array skirt and a second array skirt, each having a stacked-groove structure;
   a splice assembly, spanned across and located within the stacked-groove structures of the first array skirt and the second array skirt, and configured to align the first array skirt and the second array skirt; and at least one mounting foot, engaged with a portion of the stacked-groove structures, and wherein the mounting foot is configured to adjust a height of the array skirt assembly.

9. The array skirt assembly of claim 8, wherein the at least one mounting foot is further configured to couple with a photovoltaic module.

10. The array skirt assembly of claim 8, further comprising an anti-rotation element coupled to both the at least one mounting foot and an anti-rotation region of the stacked-groove structures.

11. The array skirt assembly of claim 10, wherein the anti-rotation element is an anti-rotation clip configured to couple within an upper anti-rotation region.

12. The array skirt assembly of claim 10, wherein the anti-rotation element is an anti-rotation grip configured to couple within a lower anti-rotation region.

13. The array skirt assembly of claim 8, wherein the splice assembly comprises a splice base that is located within an inner channel of the stacked-groove structures.

14. The array skirt assembly of claim 13, wherein the mounting foot and the splice base occupy overlapping positions along the stacked-groove structures.

15. The array skirt assembly of claim 13, wherein the splice assembly further comprises a cartridge and at least one rotating connector.

16. The array skirt assembly of claim 15, wherein the at least one rotating connector is configured to secure the first array skirt and second array skirt to the splice assembly.

17. The array skirt assembly of claim 15, wherein the cartridge is configured to maintain a minimum separation distance between the at least one rotating connector and the splice base.

18. The array skirt of claim 1, wherein the mounting structure that the array skirt is configured to couple with is a mounting foot configured to adjust a height of the array skirt assembly.

19. The array skirt assembly of claim 8, wherein at least one mounting foot is engaged with each of the first array skirt and the second array skirt.

* * * * *